US009551579B1

(12) United States Patent
Sheridan et al.

(10) Patent No.: US 9,551,579 B1
(45) Date of Patent: Jan. 24, 2017

(54) AUTOMATIC CONNECTION OF IMAGES USING VISUAL FEATURES

(71) Applicant: Google Inc., Mountain View, CA (US)

(72) Inventors: Alan Sheridan, San Jose, CA (US); Scott Benjamin Satkin, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/821,118

(22) Filed: Aug. 7, 2015

(51) Int. Cl.
*G06K 9/00* (2006.01)
*G01C 21/00* (2006.01)
*G06K 9/03* (2006.01)
*G06T 7/00* (2006.01)

(52) U.S. Cl.
CPC ........... *G01C 21/00* (2013.01); *G06K 9/00536* (2013.01); *G06K 9/03* (2013.01); *G06T 7/0042* (2013.01)

(58) Field of Classification Search
CPC ...... G01C 21/00; G06K 9/00536; G06K 9/03; G06T 7/0042
See application file for complete search history.

(56) References Cited

U.S. PATENT DOCUMENTS

| 5,583,795 A * | 12/1996 | Smyth | A61B 3/0025 359/630 |
| 9,183,572 B2 * | 11/2015 | Brubaker | G06Q 30/02 |
| 2016/0116738 A1 * | 4/2016 | Osterhout | G06F 3/03545 345/179 |

OTHER PUBLICATIONS

Bradley, D.; Brunton, Alan; Fiala, Mark; Roth, Gerhard, "Image-Based Navigation in Real Environments Using Panoramas", IEEE International Workshop on Haptic Audio Visual Environments and their Applications, Oct. 2005.
Dana Cobzas, Martin Jagersand and Hong Zhang Computing Science, "A Panoramic Model for Remote Robot Environment Mapping and Predictive Display", 2005.
Feng Shi, "Panorama Interpolation for Image-based Navigation", copyright Dec. 2007.
ICS 161: Design and Anlaysis of Algorithms Lecture nores for Feb. 6, 1996, Minimum Spanning trees, <https://www.ics.uci.edu/~eppstein/161/960206.html>.
Lee et al., "Two Algorithms for Construction a Delaunay Triangulation", International Journal of Computer and Information Sciences, vol. 9, No. 3, 1980, <http://www.personal.psu.edu/faculty/c/x/cxc11/AERSP560/Delauney/13_Two_algorithms_Delauney.pdf>.

\* cited by examiner

*Primary Examiner* — Shefali Goradia
(74) *Attorney, Agent, or Firm* — Lerner, David, Littenberg, Krumholz & Mentlik, LLP (57) ABSTRACT

Aspects of the disclosure relate generating navigation paths between images. A first image taken from a first location and a second image taken from a second location may be selected. A position of the first location in relation to the second location may be determined. First and second frames for the first and second images may be selected based on the position. First and second sets of visual features for each of the first and second image frames may be identified. Matching visual features between the first set of visual features and the second set of visual features may be determined. A confidence level for a line-of-sight between the first and second images may be determined by evaluating one or more positions of the matching visual features. Based on at least the confidence level, a navigation path from the first image to the second image is generated.

20 Claims, 10 Drawing Sheets

AUTOMATIC CONNECTION OF IMAGES USING VISUAL FEATURES

BACKGROUND OF THE INVENTION

There is now an enormous amount of spherical panoramic images around the world. Because the imagery between different panoramic images line up when the panoramic images themselves are realistically posed relative to the Earth, nearby connected panoramic images allow users to navigate through them in a way that feels as if they are navigating a real three-dimensional space. However, determining connectivity between panoramic images based on distance and graph topology is non-trivial, especially without knowledge of the geometry of the panoramic images. An added challenge is presented for panoramic images that are not captured along streets or other areas in which panoramic images generally share a line-of-sight.

BRIEF SUMMARY OF THE INVENTION

Aspects of the disclosure provide for a method. The method includes selecting, by one or more processors, a first image taken from a first location and a second image taken from a second location; determining, by the one or more processors, a position of the first location in relation to the second location; selecting, by the one or more processors, a first frame on the first image and a second frame on the second image based on the position; identifying, by the one or more processors, a first set of visual features of the first image in the first frame and a second set of visual feature of the second image in the second frame; determining, by the one or more processors, a number of matching visual features between the first set of visual features and the second set of visual features; determining, by the one or more processors, a confidence level for a line-of-sight between the first image and the second image by evaluating one or more positions of the matching visual features; and generating, by the one or more processors, based on at least the confidence level, a navigation path from the first image to the second image.

In one example, the first frame is in a direction from the first location and the second frame is in the direction from the second location and the first and second frames are centered around a straight-line path between the first location and the second location. In another example, determining the position of the first location in relation to the second location also includes determining pose information of the first image and the second image, the pose information including orientation information of the first image and the second image with respect to cardinal directions.

In a further example, the method also includes, for a given pair of matching first and second visual features evaluating positions of the first and second matching visual features, casting a first ray from the first location to the first matching visual feature in the first panoramic image; casting a second ray from the second location to the second matching visual feature in the second panoramic image; and determining whether the first ray and the second ray come closest to each other in an area between the first panoramic image and the second panoramic image, wherein the confidence level is determined further based on the determination of whether the first ray and the second ray come closest to each other in the area between the first panoramic image and the second panoramic image.

In yet another example, determining the confidence level for a line-of-sight also includes assigning a weight to each pair of matching visual features, the weight corresponding to at least one of (1) reprojection error of the given matching visual features; (2) angular distances of each of the given matching visual features from a straight-line path between the first location and the second location; and (3) visual similarities between the given matching visual features. In this example, the confidence level may be determined according to at least one of (1) a percentage of identified visual features that are matching visual features; (2) the weight assigned to each pair of matching visual features; (3) a distance between the first image and the second image; and (4) a residual error of the estimated locations of the matching visual features.

Alternatively or additionally in this example, the estimated location of the matching visual features may be determined by casting a first ray from the first location to a first feature in the first set of visual features; casting a second ray from the second location to a second feature in the second set of visual features, the first feature and the second feature being a pair of matching visual features; and when the first ray and the second ray are within a predetermined distance of one another, setting a point closest to where the first ray and second ray come closest to one another as the estimated location of the first feature and the second feature. In this alternative or additional example, the method may also include, when the first ray and the second ray are not within the predetermined distance or diverge, removing the pair of matching visual features from the number of matching visual features.

In another example, the navigation path is also generated according to one or more constraints. In this example, the one or more constraints may include at least one of minimum spanning tree constraints, Delaunay Triangulation constraints, setting number of edges per vertex, setting a maximum distance for edges, permitting only one layer of redundancy, and minimizing a distance between a pair of vertices.

Another aspect of the disclosure provides for another method. This method includes selecting, by one or more processors, a plurality of images; for every pair of images in the plurality of images, determining, by the one or more processors, a confidence level for connectivity between each pair of images by (1) determining, by the one or more processors, a position of a first image of the pair taken at a first location in relation to a second image of the pair taken at a second location, (2) projecting, by the one or more processors, a frame from the first location along a straight-line path between the first location and the second location and onto the first image and the second image, (3) identifying, by the one or more processors, a first set of visual features of the first image within the projection of the frame on the first image, (4) identifying, by the one or more processors, a second set of visual features of the second image within the projection of the frame on the second image, and (5) determining, by the one or more processors, matching visual feature between the first set of visual features and the second set of visual features; determining a confidence level for a line-of-sight between the first image and the second image based on at least the matching visual features; and generating, by the one or more processors, navigation paths between one or more pairs of images according to the confidence level for each pair of images.

In one example, the method also includes generating, by the one or more processors, a connection graph, wherein each image is a vertex in the connection graph and each navigation path is an edge in the connection graph. In this example, generating the connection graph may also include removing at least one edge by applying one or more constraints. The one or more constraints includes at least one of minimum spanning tree constraints, Delaunay Triangulation constraints, setting number of edges per vertex, setting a maximum distance for edges, permitting only one layer of redundancy, and minimizing a distance between a pair of vertices.

Yet another aspect of the disclosure provides a system. The system includes memory storing a first image taken from a first location and a second image taken from a second location; one or more computing devices having one or more processors configured to determine a position of the first location in relation to the second location, select a first frame on the first image and a second frame on the second image based on the position, identity a first set of visual features of the first image in the first frame and a second set of visual feature of the second image in the second frame, determine a number of matching visual features between the first set of visual features and the second set of visual features, determine a confidence level for a line-of-sight between the first image and the second image by evaluating one or more positions of the matching visual features, and generate based on at least the confidence level, a navigation path from the first image to the second image.

In one example, the first frame is in a direction from the first location and the second frame is in the direction from the second location, and the first and second frames are centered around a straight-line path between the first location and the second location. In another example, the one or more processors are also configured to determine the position by also determining pose information of the first image and the second image, the pose information including orientation information of the first image and the second image with respect to cardinal directions.

In a further example, the one or more processors are also configured to, for a given pair of matching first and second visual features, evaluate positions of the first and second matching visual features by casting a first ray from the first location to the first matching visual feature in the first panoramic image, casting a second ray from the second location to the second matching visual feature in the second panoramic image, determining whether the first ray and the second ray come closest to each other in an area between the first panoramic image and the second panoramic image, and determining the confidence level further based on the determination of whether the first ray and the second ray come closest to each other in the area between the first panoramic image and the second panoramic image.

In yet another example, the one or more processors are also configured to determine the confidence level by also assigning a weight to each pair of matching visual features, the weight corresponding to at least one of (1) reprojection error of the given matching visual features; (2) angular distances of each of the given matching visual features from a straight-line path between the first location and the second location; and (3) visual similarities between the given matching visual features. In this example, the one or more processors may also be configured to determine the estimated location of the matching visual features by casting a first ray from the first location to a first feature in the first set of visual features, casting a second ray from the second location to a second feature in the second set of visual features, the first feature and the second feature being a pair of matching visual features, and when the first ray and the second ray are within a predetermined distance of one another, setting a point closest to where the first ray and second ray come closest to one another as the estimated location of the first feature and the second feature.

DETAILED DESCRIPTION

Overview

The technology relates to automatically generating connections between images for realistic navigation from one to another. An image may be a panoramic image which captures a wide field of view from a given location. Using the known locations and poses of panoramic images, one panoramic image may be connected to nearby panoramic images in a way that the features between different panoramic images line up realistically. To generate realistic connections, obstacles such as walls or bushes should be taken into account. In this regard, only panoramic images between which there is a line-of-sight should be connected. Users may then navigate through the panoramic images as if they were navigating a real 3D space, avoiding any obstacles that are present.

For panoramic images along streets, connectivity may be determined based largely on the position and angle of the image. For example, images may be captured from a vehicle as the vehicle is driving down a street. Images may be captured in runs, or at regular intervals as the vehicle travels a certain distance. Using on-device sensors, pose and location information may be associated with each image as the moment the image is captured. Images captured along the street in this manner may generally follow a clear path. As such, neighboring images may automatically be connected spatially using the pose and the location information of the images without considering visual features. In other words, panoramic images that are next to each other along a road may be connected. Panoramic images at an intersection of two roads may be connected spatially as well. Alternatively, the order in time in which the images were captured may be used to automatically connect images spatially. However, for collections of panoramic images without streets to guide the process, information such as distance, pose, common features, shared line-of-sight, geometry, etc. may be used to accurately and quickly determine connectivity between panoramic images.

In order to determine connectivity between two panoramic images, a first panoramic image and a second panoramic image may be selected. The first panoramic image may have been captured from a first location, and a second panoramic image may have been captured from a second location that is near, for example within a few meters or more or less, of the first location. The first and the second panoramic images may be associated with location information and pose information. The location and pose information may be used to determine the positions of the first and the second panoramic images in relation to each other.

Once the positions of the panoramic images are selected, frames of the first panoramic image and the second panoramic image may be identified. The identified frames may be centered around a straight-line path between the first location and the second location and positioned in a direction relative a capture location of the respective panoramic image on which the frames lay. In this regard, frames between two panoramic images may be in a same position relative to their respective panoramic image. As an example, a frame may cover an angular distance between zero and 180 degrees as measured from the respective capture location.

Sets of visual features of the first panoramic image and the second panoramic image within each frame may be identified. The location of the identified visual features within the frame and in relation to one another may be identified as well. Visual features may be identified using any number of object recognition techniques.

Identified visual features in a frame on the first panoramic image may be compared with identified visual features in a frame on the second panoramic image to identify any matching features. A match between two visual features may indicate that the visual features represent the same object or portion of an object.

Connectivity may be based on whether there is a line-of-sight between the first panoramic image and the second panoramic image. In other words, if there is a line-of-sight between the first panoramic image and the second panoramic image, then the first and second panoramic images may be connected.

In order to determine a confidence level for a line-of-sight between the first panoramic image and the second panoramic image, the positions of the matching visual features may be evaluated. There may be a line-of-sight between the first panoramic image and the second panoramic image where matching visual features are positioned in a same or similar direction relative to the first panoramic image and the second panoramic image. Therefore, based on whether the rays starting from a location where two images were captured and extending towards a given pair of matching visual features point in a same or similar direction, a confidence level for connectivity may be determined. If the rays for the given pair of matching visual features point in the same or similar direction, the confidence level may be higher than if the rays point in opposite or nearly opposite directions.

The confidence level may be further based on a weight given to each pair of matching visual features. In one example, a given pair of matching visual features may be weighted based on how close estimated locations of features are to their actual locations. Matching pairs of visual features with more accurate estimated distances may be given greater weight than those with more inaccurate estimated distances. On the other hand, if one or both estimated distances differ more than an acceptable degree from the actual differences, then a matching pair of visual features may be considered a false match and may be disregarded.

Another example of weighting a given pair of matching visual features is based on the angular distance of the visual features from the straight-line path. Matching visual features with small angular distances may be weighted higher than those with greater angular distances. A further basis to weighting a given pair of matching visual features may be a percentage of the identified features that are matching visual features between two frames of two panoramic images.

If the confidence level meets a threshold confidence value, it may be determined that a line-of-sight exists between the first panoramic image and the second panoramic image. As such, a connection may be generated from the first panoramic image to the second panoramic image along the straight-line path between the first location and the second location. However, if the confidence level does not meet the threshold value, then it may be determined that a line-of-sight does not exist or rather, that there is some obstacle between the locations of the first panoramic image and the second panoramic image that would prevent a person from moving directly between the locations. In this example, no connection may be generated between the first and the second panoramic images. A connection may include information identifying a three dimensional (3D) relationship between the two images or 3D transitions that simulate navigating through the space from the first location to the second location along the straight-line path.

For an entire collection of panoramic images, a connection graph may be created using the above-mentioned method. In the connection graph, each location of a panoramic image may be a vertex and each connection between two panoramic images may be an edge. One panoramic image may have a connection with more than one other panoramic image. The number of connections in a connection graph may be reduced by applying a number of constraints. Constraints may include those used in minimum spanning trees and/or Delaunay Triangulation. If applying the constraints creates two separate sets of panoramic images that are not connected, at least one existing connection in the connection graph between the two sets of panoramic images may not be removed.

Example Systems

Figure 1:
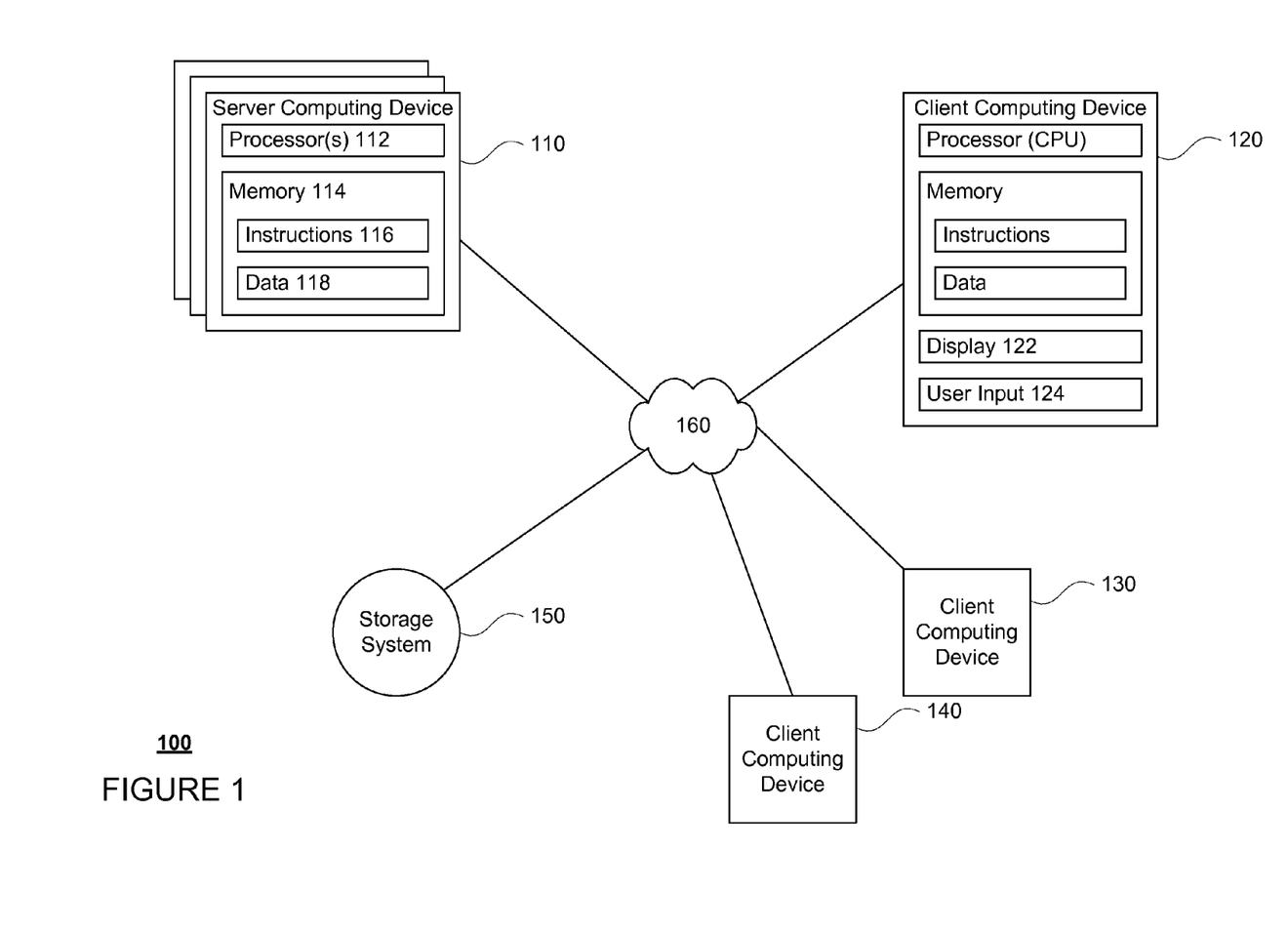
FIG. 1 is a functional diagram of an example system in accordance with aspects of the disclosure.
Figure 2:
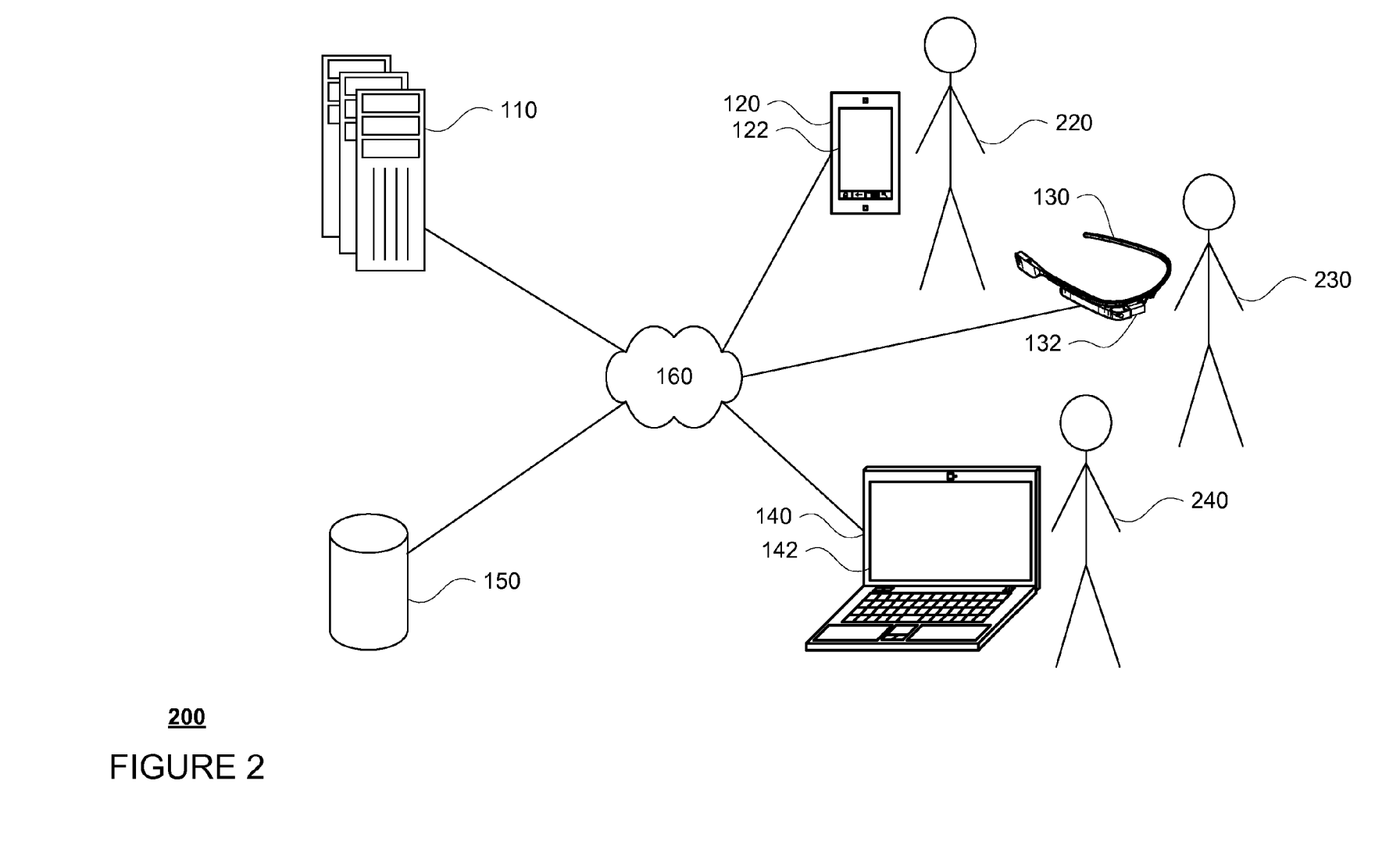
FIG. 2 is a pictorial diagram of the example system of FIG. 1.

FIGS. 1 and 2 include an example system 100 in which the features described herein may be implemented. It should not be considered as limiting the scope of the disclosure or usefulness of the features described herein. In this example, system 100 can include one or more computing devices 110, 120, 130, and 140, as well as storage system 150. One or more computing devices 110 can contain one or more processors 112, memory 114 and other components typically present in general purpose computing devices. Memory 114 of the one or more computing devices 110 can store information accessible by one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or structured (e.g., XML documents). The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, one or more computing devices 110 may include specialized hardware components to perform specific computing processes, such as decoding video, matching video frames with images, distorting videos, encoding distorted videos, etc. faster or more efficiently.

Although FIG. 1 functionally illustrates the processor(s), memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in one or more housings different from those of the one or more computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 180.

The one or more computing devices 110 can be at various nodes of a network 180 and capable of directly and indirectly communicating with other nodes of network 180. Although only a few computing devices are depicted in FIGS. 1-2, it should be appreciated that a typical system can include a large number of connected computing devices, with each different computing device (as well as collection device) being at a different node of the network 180. The network 180 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, the one or more computing devices 110 may include one or more web servers that are capable of communicating with storage system 150 as well as computing devices 120, 130, and 140 via the network. For example, one or more server computing devices 110 may use network 180 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store various types of information. As described in more detail below, the storage system 150 may store various formats of visual media, such as images or videos. Some images or and videos may be part of a sequence in a navigation experience, which may also be stored on storage system 150. These images or videos may be part of image files that are associated with other information, such as an image identifier that can be used to retrieve the image, the time the image was created, where the image was taken, from what angle the image is being viewed, and image format (JPEG, TIFF, etc.). The image file may contain a timestamp with information such as a date and the time of when the image was captured. The image file may also contain pose information including geographic location information indicating the location (such as latitude and longitude or other location coordinates), and orientation information (pose) at which the image was captured.

Storage system 150 may store images, image location data, image pose information, 3D geometry data, and algorithms for analyzing and manipulating images or videos. As an example, location information may include latitude/longitude coordinates. The pose of an image may be determined or known such that the image may be realistically posed (or oriented) relative to the earth. At least some of the stored images may including panoramic images have a field of view greater than 180 degrees. Some of the stored images may include spherical panoramic images having a field of view of 360 degrees. For spherical panoramic images, pose information may indicate which parts of the panoramic image points up, down, North, South, East, and/or West. The 3D geometry data may include three dimensional meshes and/or points which identify physical features at locations depicted in at least some of the images. The images may be organized and stored as collections based on being captured in a similar location or having similar features. Connections between images may be stored on storage system 150 as well.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 180 as shown in FIG. 1 and/or may be directly connected to or incorporated into any of the computing devices 110-140 (not shown).

Example Methods

In addition to the operations described above and illustrated in the figures, various operations will now be described. The following operations do not have to be performed in the precise order described below. Rather, various steps can be handled in a different order or simultaneously, and steps may also be added or omitted.

Figure 3:
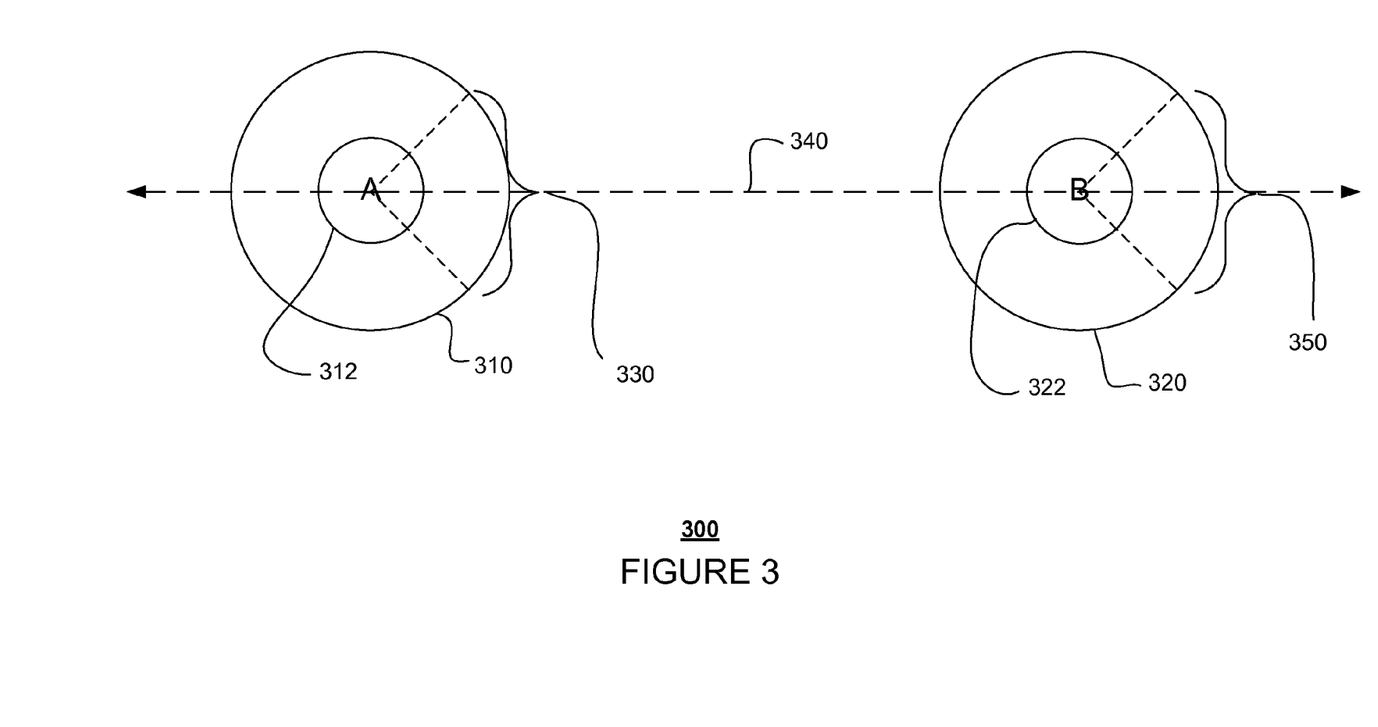
FIG. 3 is an illustration of relationships between two images in accordance with aspects of the disclosure.

As shown in FIG. 3, a first panoramic image 310 captured from a location A may be selected for determining connectivity to the neighboring panoramic images. A nearby second panoramic image 320 captured from a location B 322 may be selected. The first and the second panoramic images may be associated with location information and pose information. The first and the second panoramic image may be spherical panoramic images, having a complete 360 degree field of view from the first and the second locations, respectively. The 3D geometry of the space captured by the first and the second panoramic images may be known. Alternatively, 3D geometry of the space may also be unknown. The positions of the first and the second panoramic images in relation to each other may be determined using the location and pose information associated with each panoramic image.

Once the positions of the panoramic images are selected, frames of the first panoramic image and the second panoramic image may be identified. Thus, turning to FIG. 3, using the determined positions, a first frame 330 on the first panoramic image 310 may be selected. The selected first frame 330 may be in a hemisphere adjacent to the second panoramic image 320 and centered around a straight-line path 340 between location A and location B. A second frame 350 on the second panoramic image 320 may be selected also. The second frame 350 may be centered around the straight-line path 340. The second frame 350 may enclose a portion of the second panoramic image 320 in a hemisphere opposite location A.

Figure 4:
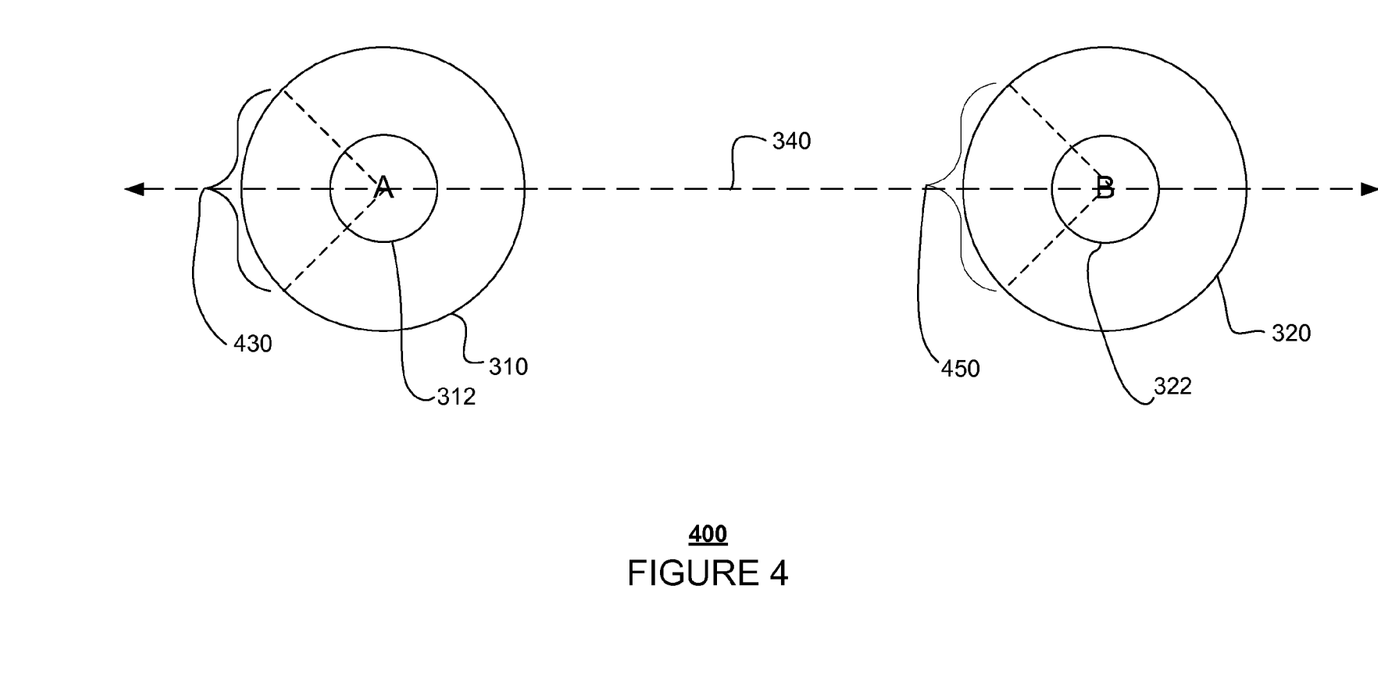
FIG. 4 is illustration of the relationships between two images and frames in accordance with aspects of the disclosure.

As shown in FIG. 4, a third frame 430 on the first panoramic image 310 may also be selected. The third frame 430 may be centered around the straight-line path 440 in a hemisphere opposite location B. Additionally, a fourth frame 450 on the second panoramic image 320 may be selected. The fourth frame 450 may be centered around the straight-line path 440 in a hemisphere adjacent to the first panoramic image 310. The first 330, second 350, third 430, and fourth 450 frames may cover an angular distance between zero and 180 degrees as measured from the respective capture location; for example, 45 degrees or 90 degrees.

Sets of visual features of the first panoramic image and the second panoramic image within each frame may be identified. A first set of visual features of the first panoramic image 310 within the first frame 330 may be identified. A second set of visual features of the second panoramic image 320 within the second frame 350 may be identified as well. A third and fourth set of visual features may be identified in the third 430 and fourth 450 frames, respectively. Visual features may include lines, corners, textures, etc. The location of the identified visual features within the frame and in relation to one another may be determined as well. Visual features may be identified using any number of object recognition techniques.

Identified visual features in a frame on the first panoramic image may be compared with identified visual features in a frame on the second panoramic image to identify any matching features. In this regard, the first set of visual features may be compared with the second set of visual features and the third set of visual features may be compared with the fourth set of visual features. Additionally, the second set of visual features may be compared with the third set of visual features to identify any matching features. A match between two visual features may indicate that the visual features represent the same object or portion of an object. Matching visual features may include, for example, matching or corresponding objects, patterns, textures, colors, shapes etc. at corresponding positions, or any other known visual feature matching algorithms.

Figure 5A:
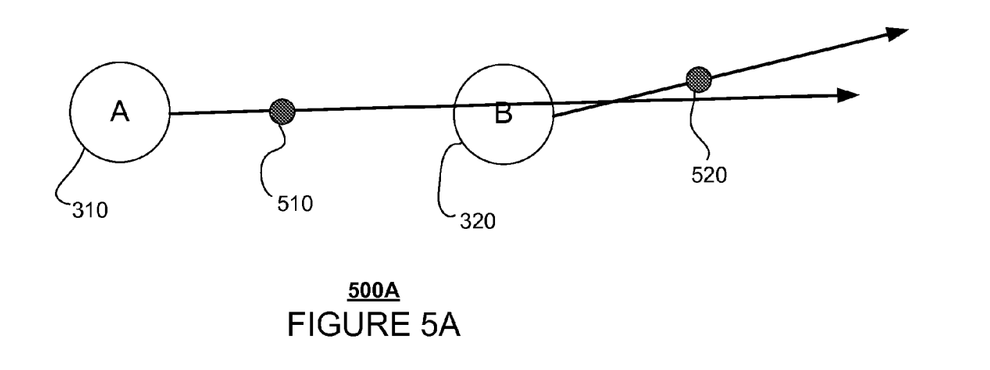
FIG. 5A is an illustration of images and data in accordance with aspects of the disclosure.
Figure 5B:
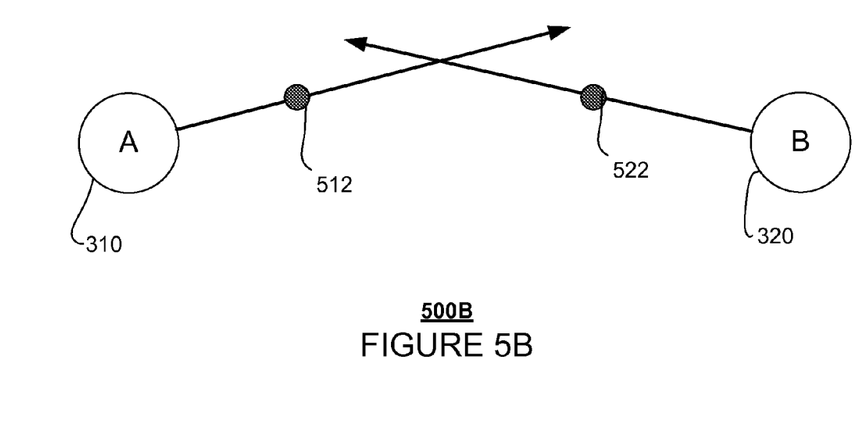
FIG. 5B is another illustration of images and data in accordance with aspects of the disclosure.

A confidence level for a line-of-sight between the first panoramic image and the second panoramic image may be determined by evaluating the positions of the matching visual features, as shown in FIGS. 5A-5D. A confidence level for a line-of-sight may be determined based on whether rays cast from a capture location of the panoramic image to a given pair of matching visual features intersect in an area between the first panoramic image and the second panoramic image. If the rays for the given pair of matching visual features intersect outside of the area between the first panoramic image and the second panoramic image, as shown in FIG. 5A, the confidence level may be higher than if the rays intersect in the area between the panoramic images, as shown in FIG. 5B.

As shown in FIG. 5A, a ray may be cast from location A to a visual feature 510 in the first panoramic image 310 and from location B to a visual feature 520 in the second panoramic image 320. Because the rays in FIG. 5A point in the same direction, the confidence level for a line-of-sight may be increased. On the other hand, as shown in FIG. 5B, a ray may be cast from location A to another visual feature 512 in the first panoramic image 310 and from location B to another visual feature 522 in the second panoramic image 320. Because the rays in FIG. 5B point in nearly opposite directions, the confidence level for line-of-sight may be decreased.

The determined confidence level may be further based on a weight given to each pair of matching visual features. One way to weight a given pair of matching visual features is based on the level of similarity between the given pair. For example, the more similarities between the given pair of matching visual features, the more likely the match is good.

Figure 5C:
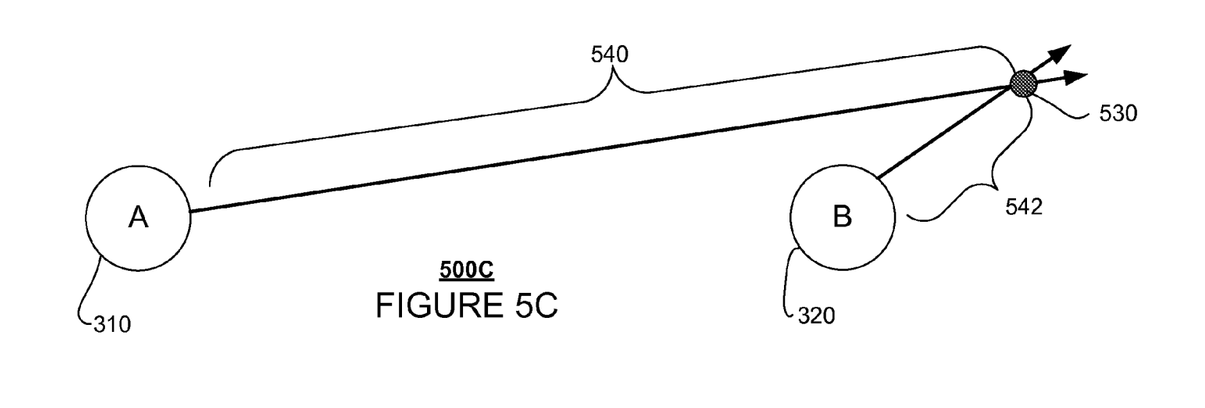
FIG. 5C is another illustration of images and data in accordance with aspects of the disclosure.

Another way to weight a given pair of matching visual features is based on reprojection error, or how close estimated distances of features are to their actual distances. As shown in FIG. 5C, to determine the estimated location, a ray may be cast from location A to a feature in the first set of visual features. Another ray may be cast from location B to the matching feature in the second set of visual features. The intersection of the rays 530, or in most examples, the point between the rays where they are closest to one another where the rays do not actually intersect, may be the estimated location of the feature. The actual distance of the feature in relation to the location A and location B may be known or may be determined based on the known 3D geometry data for the first and second panoramic images or the locations of these images. Therefore, the estimated distance 540 between location A and the intersection (or point between the rays) may be determined and compared to the actual distance between location A and the feature. The same can be done for the estimated distance 542 from location B. The given pair of matching visual features may then be weighted based on how close the estimated distances 540, 542 are to the actual distances. The matching visual features with more accurate estimated distances may be weighted more than those with more inaccurate estimated distances. However if the rays do not come within a minimum threshold distance of one another (e.g. they are too far from one another) or one or both estimated distances differ more than an acceptable degree from the actual differences, then the match may be considered a false match and may be disregarded.

Weighting of a given pair of matching visual features may also be based on the angular difference at the closest point between two rays cast in the direction of the given pair of matching visual features. If the two rays actually intersect, then the angular difference is zero. The farther two rays are from intersecting, the poor quality the match between the corresponding visual features is. Therefore less weight may be assigned to pairs of matching visual features where the corresponding rays have a greater angular difference.

Figure 5D:
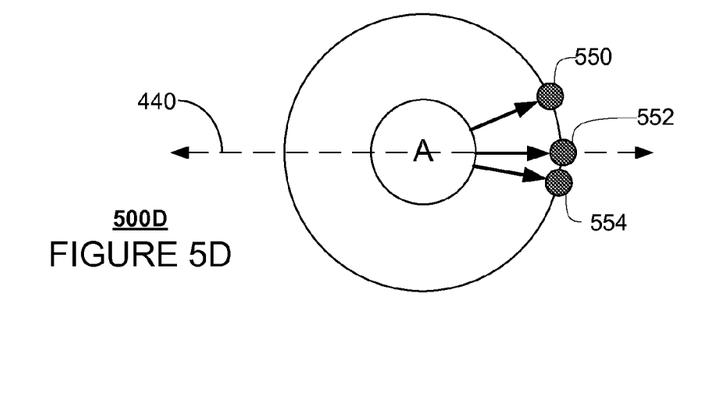
FIG. 5D an illustration of an image and data in accordance with aspects of the disclosure.

Another example of weighting a given pair of matching visual features is based on the angular distance of the visual features from the straight-line path. As shown in FIG. 5D, the angular distance of a matching feature may be determined by casting a ray from location A to matching features 550, 552, 554 and measuring the angle between the ray and the straight-line path 340. Matching visual features with small angular distances may be weighted higher than those with greater angular distances.

The confidence level may further be determined based on what percentage of the identified features are matching visual features. The relationship between the percentage of matching visual features and the confidence level may be based on other factors, such as the weight of a given pair of matching visual features, an absolute number of matching visual features, a distance between the first and the second panoramic images, and a residual error of the estimated feature locations. If the percentage is small but there is a large percentage of matching visual features within a small angular distance from the straight-line path, the confidence level may be high. In the same way, if the absolute number of matching visual features is high, then the confidence level may still be high despite the low percentage of matching visual features. The same can be said for when the distance between the panoramic images is long or when the residual error of the estimated feature locations is low.

The final confidence level for a line-of-sight between two images may be based on any combination of the above. In this regard, the weights may be combined together as a sum, weighted sum, or using any other known technique of combining weighted values.

If the final confidence level meets a threshold value, it may be determined that a line-of-sight exists between the first panoramic image 310 and the second panoramic image 320 and a connection may be generated from the first panoramic image 310 to the second panoramic image 320 along the straight-line path 340 between the first location and the second location. However, if the final confidence level does not meet the threshold, e, then it may be determined that a line-of-sight does not exist or rather, that there is some obstacle between the locations of the first panoramic image and the second panoramic image that would prevent a person from moving directly between the locations. A connection may include information identifying a three dimensional (3D) relationship between the two images a 3D transitions that simulate navigating through the space from the first location to the second location along the straight-line path. In this regard, each connection may represent a navigation path between two images.

Figure 6:
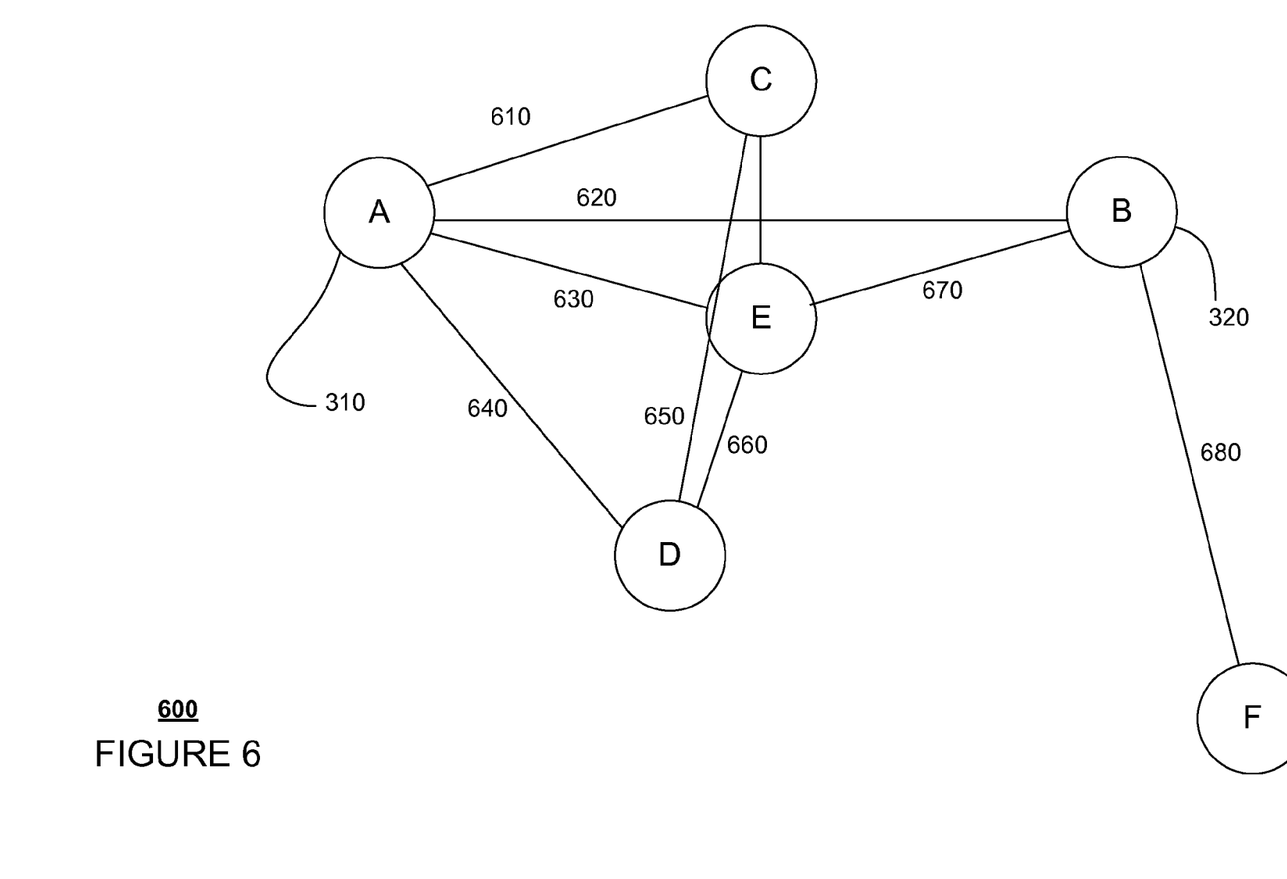
FIG. 6 is a illustration of a collection of panoramic images and relationships in accordance with aspects of the disclosure.
Figure 7:
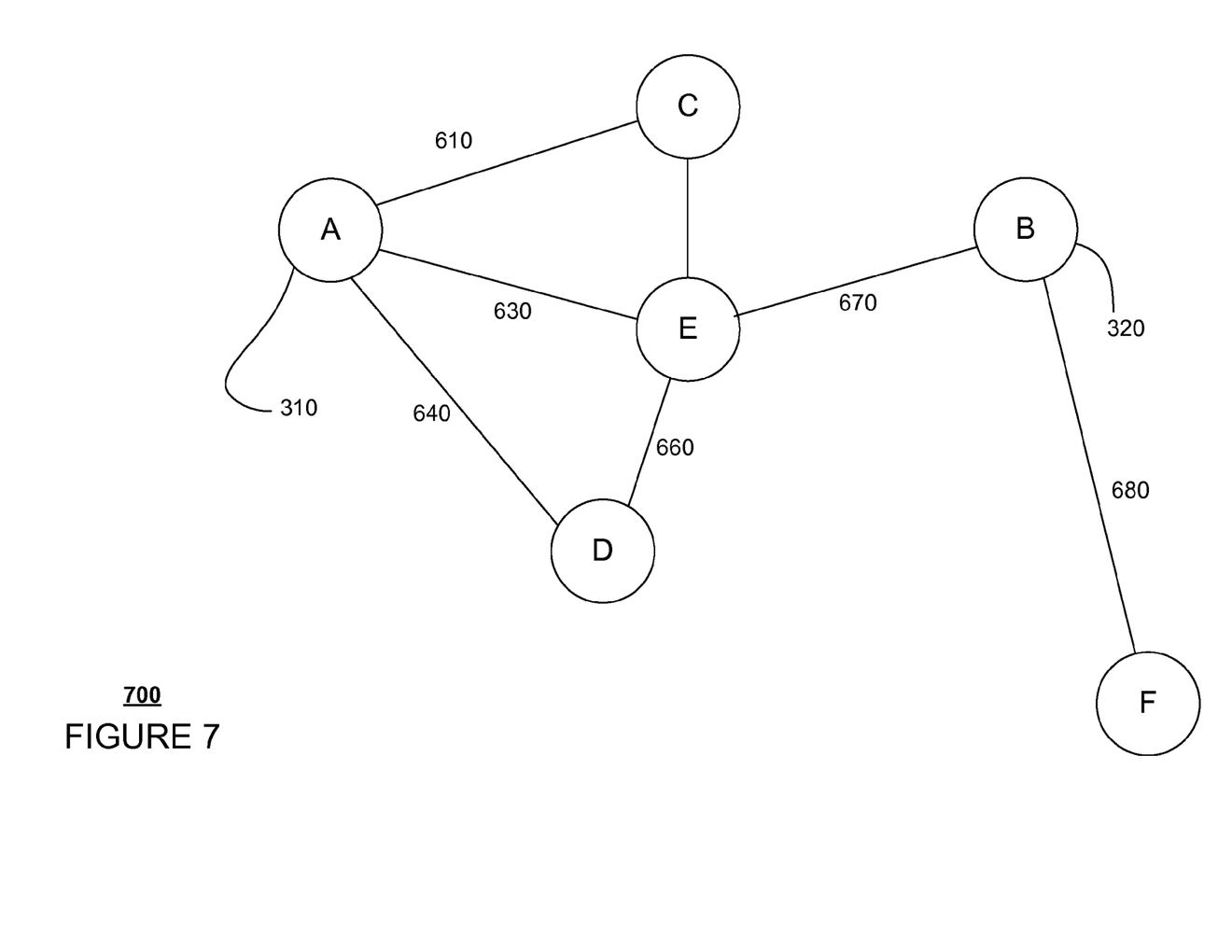
FIG. 7 is an illustration of another example collection of panoramic images and relationships in accordance with aspects of the disclosure.

When the above-mentioned features are performed for an entire collection of panoramic images, a connection graph may be created. As shown in FIG. 6, in the connection graph 600, each location A, B, C, D, E, F corresponding to the location a panoramic image may be mapped as a vertex and each connection 610, 620, 630, 640, 650, 660, 670, 680 between two panoramic images may be an edge. One panoramic image may have a connection with more than one other panoramic image so long as there is a line-of-sight between the images as determined using the features above. A graph may become over-connected when panoramic images in a collection were densely connected and share a large amount of visual features between all of the panoramic images. The challenge becomes generating connections that may result in realistic navigation paths that pass through the collection of panoramic images in a sequential manner, as shown in FIG. 7.

To reduce the number of connections in a connection graph, a number of constraints may be used. Constraints may include those used in minimum spanning trees and/or Delaunay Triangulation. In addition or alternatively, constraints may include generating only a predetermined number of connections per panoramic image, generating connections less than a predetermined distance, allowing only one layer of redundancy, and/or minimizing the distance between a given pair of nodes. Constraints may be applied in a series of increasingly restrictive iterations. Alternatively, the constraints used to reduce the number of connections may be configured as constraints to the formation of a connection at the outset of the above-described method. As a result, as shown in FIG. 7, connections 620 and 650 may be removed to reduce the number of connections in connection graph 600 to create new, less densely connected connection graph 700.

If applying the constraints creates two separate sets of panoramic images that are not connected, at least one existing connection in the connection graph between the two sets of panoramic images may not be removed. Alternatively, less restrictive constraints may be applied to ensure that all panoramic images in the collection are connected to at least one other panoramic image in the collection. For example, if connection 680 were removed from connection graph 700, location F would have no connections to any other location. Therefore, if applying a constraint were to remove connection 680, an exception may be made for connection 680 in order to preserve at least one connection with location F.

Figure 8:
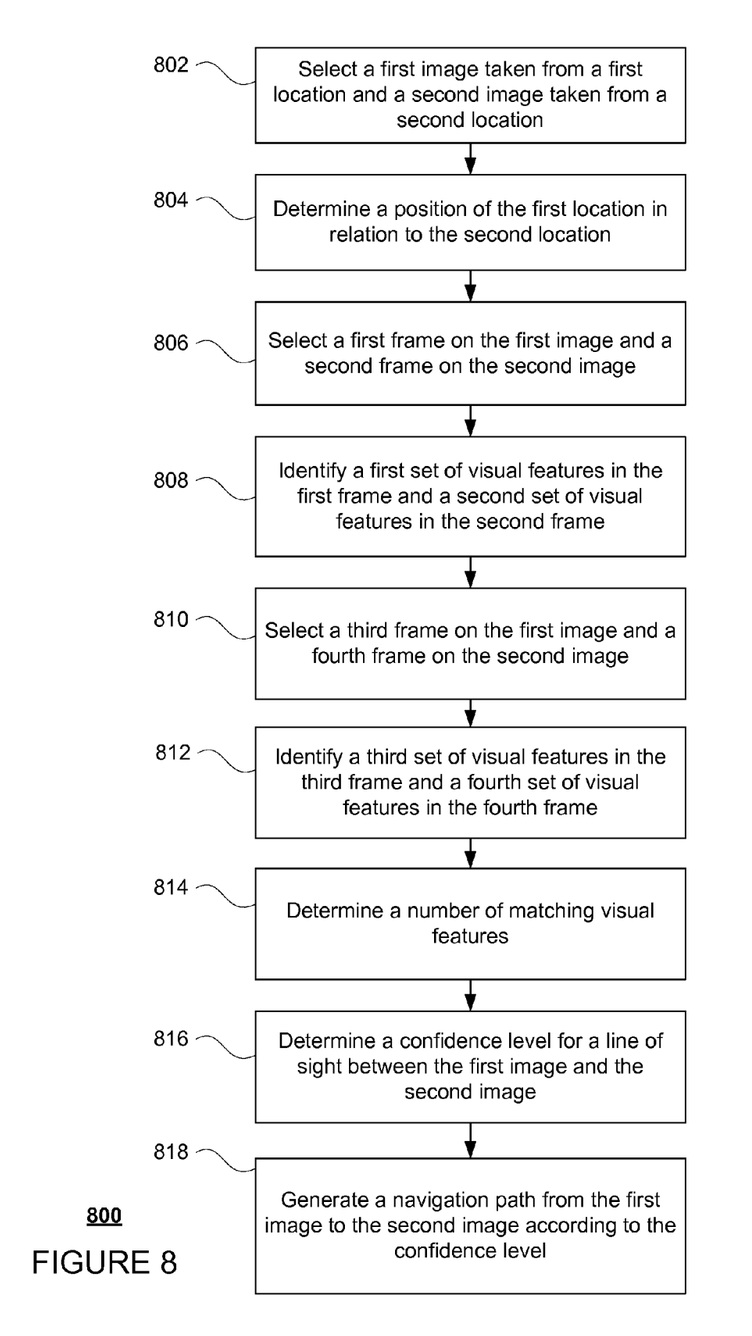
FIG. 8 is an example flow diagram in accordance with aspects of the disclosure.

FIG. 8 is an example flow diagram 800 in accordance with some of the aspects described above that may be performed by one or more computing devices such as server computing device 110. In this example, a first image taken from a first location and a second image taken from a second location may be selected at block 802. Then, a position of the first location in relation to the second location may be determined at block 804. A first frame on the first image and a second frame on the second image may be selected at block 806, the first frame and second frame being in a same direction relative to the first position and second position, respectively. A first set of visual features and a second set of visual features may be identified in the first frame and the second frame, respectively at block 808. In a similar manner, a third frame on the first image and a fourth frame on the second image may be selected at block 810, and a third and a fourth set of visual features may be identified in the third and fourth frames, respectively, at block 812. A number of matching visual features between the first and second frames and between the third and fourth frames may be determined at block 814. Based on the matching visual features, a confidence level for a line-of-sight between the first image and the second image may be determined at block 816. According to the confidence level, a navigation path from the first image to the second image may be generated at block 818.

Figure 9:
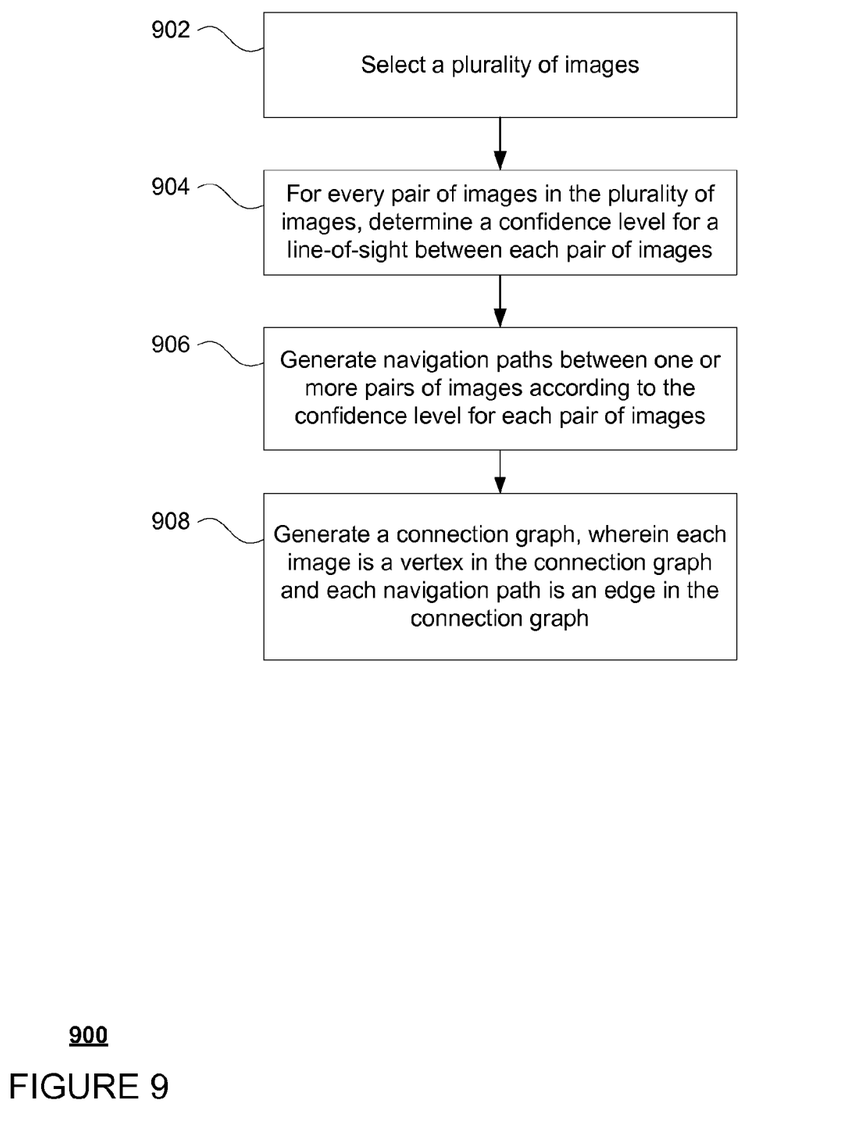
FIG. 9 is another example flow diagram in accordance with other aspects of the disclosure.

FIG. 9 is another example flow diagram 900 in accordance with some of the aspects described above that may be performed by one or more computing devices such as server computing device 110. In this example, a plurality of images may be selected at block 902. For every pair of images in the plurality of images, a confidence level for a line-of-sight between each pair of images may be determined at block 904. According to the confidence level for each pair of images, navigation paths between one or more pairs of images may be generated at block 906. A connection graph may therefore be generated at block 908, wherein each image is a vertex in the connection graph and each navigation path is an edge in the connection graph.

A user, such as user 220, may use the panoramas or collection of panoramas to virtually explore the areas depicted by the panoramas as a person would walk through the world. The user 220 may travel between panoramas where there is a clear line of sight and avoid paths that are obstructed by an object, such as a wall. The connections formed between the panoramas my include information identifying a three dimensional (3D) relationship between the two images and 3D transitions that simulate navigating through the space from the first location to the second location along the straight-line path. Therefore, the user 220, start at the first panorama 310 and navigate to the second panorama 320, when there is a line-of-sight between the first and the second panorama. If there is no line-of-sight between the first panorama 310 and the second panorama 320, then there is no connection and the user 220 cannot navigate from the first panorama to the second panorama, just as a person would not be able to navigate from the first location to the second location if there is an obstruction.

The features described above may be used to generate connections between images quickly and accurately that create a more realistic user experience. These connections may better model for the users the navigation between the two locations depicted by two panoramic images. Through the use of matching visual features in panoramic images with location and pose information, panoramic images with a common line-of-sight are connected. On the other hand, panoramic images between which lie one or more obstacles such as walls or bushes, through which a human being does not walk, are not connected. The resulting graph created by generating these connections in a collection of panoramic images may be used to virtually explore the locations depicted by the panoramic images as if one were actually walking through the space depicted in the panoramic images. In addition, the features described minimize the number of connections between panoramic images to allow the user to navigate through the panoramic images in a more sequential manner. These features therefore provide a quick and automatic way to connect groups of geographically close panoramic images such that users may more easily navigate locations virtually.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method comprising:
    selecting, by one or more processors, a first image taken from a first location and a second image taken from a second location;
    determining, by the one or more processors, a position of the first location in relation to the second location;
    selecting, by the one or more processors, a first frame on the first image and a second frame on the second image based on the position;
    identifying, by the one or more processors, a first set of visual features of the first image in the first frame and a second set of visual feature of the second image in the second frame;
    determining, by the one or more processors, a number of matching visual features between the first set of visual features and the second set of visual features;
    determining, by the one or more processors, a confidence level for a line-of-sight between the first image and the second image by evaluating one or more positions of the matching visual features; and
    generating, by the one or more processors, based on at least the confidence level, a navigation path from the first image to the second image.

2. The method of claim 1, wherein the first frame is in a direction from the first location and the second frame is in the direction from the second location and the first and second frames are centered around a straight-line path between the first location and the second location.

3. The method of claim 1, wherein determining the position further comprises determining pose information of the first image and the second image, the pose information including orientation information of the first image and the second image with respect to cardinal directions.

4. The method of claim 1, further comprising for a given pair of matching first and second visual features evaluating positions of the first and second matching visual features:
casting a first ray from the first location to the first matching visual feature in the first panoramic image;
casting a second ray from the second location to the second matching visual feature in the second panoramic image; and
determining whether the first ray and the second ray come closest to each other in an area between the first panoramic image and the second panoramic image,
wherein the confidence level is determined further based on the determination of whether the first ray and the second ray come closest to each other in the area between the first panoramic image and the second panoramic image.

5. The method of claim 1, wherein determining the confidence level further comprises assigning a weight to each pair of matching visual features, the weight corresponding to at least one of:
(1) reprojection error of the given matching visual features;
(2) angular distances of each of the given matching visual features from a straight-line path between the first location and the second location; and
(3) visual similarities between the given matching visual features.

6. The method of claim 5, wherein the confidence level is determined according to at least one of:
(1) a percentage of identified visual features that are matching visual features;
(2) the weight assigned to each pair of matching visual features;
(3) a distance between the first image and the second image; and
(4) a residual error of the estimated locations of the matching visual features.

7. The method of claim 5, wherein the estimated location of the matching visual features are determined by:
casting a first ray from the first location to a first feature in the first set of visual features;
casting a second ray from the second location to a second feature in the second set of visual features, the first feature and the second feature being a pair of matching visual features; and
when the first ray and the second ray are within a predetermined distance of one another, setting a point closest to where the first ray and second ray come closest to one another as the estimated location of the first feature and the second feature.

8. The method of claim 7, further comprising, when the first ray and the second ray are not within the predetermined distance or diverge, removing the pair of matching visual features from the number of matching visual features.

9. The method of claim 1, wherein the navigation path is further generated according to one or more constraints.

10. The method of claim 9, wherein the one or more constraints comprises at least one of minimum spanning tree constraints, Delaunay Triangulation constraints, setting number of edges per vertex, setting a maximum distance for edges, permitting only one layer of redundancy, and minimizing a distance between a pair of vertices.

11. A method comprising:
selecting, by one or more processors, a plurality of images;
for every pair of images in the plurality of images, determining, by the one or more processors, a confidence level for connectivity between each pair of images by:
determining, by the one or more processors, a position of a first image of the pair taken at a first location in relation to a second image of the pair taken at a second location;
projecting, by the one or more processors, a frame from the first location along a straight-line path between the first location and the second location and onto the first image and the second image;
identifying, by the one or more processors, a first set of visual features of the first image within the projection of the frame on the first image;
identifying, by the one or more processors, a second set of visual features of the second image within the projection of the frame on the second image; and
determining, by the one or more processors, matching visual feature between the first set of visual features and the second set of visual features;
determining a confidence level for a line-of-sight between the first image and the second image based on at least the matching visual features; and
generating, by the one or more processors, navigation paths between one or more pairs of images according to the confidence level for each pair of images.

12. The method of claim 11, further comprising generating, by the one or more processors, a connection graph, wherein each image is a vertex in the connection graph and each navigation path is an edge in the connection graph.

13. The method of claim 12, wherein generating the connection graph further comprises removing at least one edge by applying one or more constraints.

14. The method of claim 13, wherein the one or more constraints comprises at least one of minimum spanning tree constraints, Delaunay Triangulation constraints, setting number of edges per vertex, setting a maximum distance for edges, permitting only one layer of redundancy, and minimizing a distance between a pair of vertices.

15. A system comprising:
memory storing a first image taken from a first location and a second image taken from a second location;
one or more computing devices having one or more processors configured to:
determine a position of the first location in relation to the second location;
select a first frame on the first image and a second frame on the second image based on the position;
identity a first set of visual features of the first image in the first frame and a second set of visual feature of the second image in the second frame;
determine a number of matching visual features between the first set of visual features and the second set of visual features;
determine a confidence level for a line-of-sight between the first image and the second image by evaluating one or more positions of the matching visual features; and
generate based on at least the confidence level, a navigation path from the first image to the second image.

16. The system of claim 15, wherein the first frame is in a direction from the first location and the second frame is in the direction from the second location, and the first and second frames are centered around a straight-line path between the first location and the second location.

17. The system of claim 15, wherein the one or more processors are further configured to determine the position by further determining pose information of the first image and the second image, the pose information including orientation information of the first image and the second image with respect to cardinal directions.

18. The system of claim 15, wherein the one or more processors are further configured to, for a given pair of matching first and second visual features, evaluate positions of the first and second matching visual features by:
- casting a first ray from the first location to the first matching visual feature in the first panoramic image;
- casting a second ray from the second location to the second matching visual feature in the second panoramic image;
- determining whether the first ray and the second ray come closest to each other in an area between the first panoramic image and the second panoramic image, and
- determining the confidence level further based on the determination of whether the first ray and the second ray come closest to each other in the area between the first panoramic image and the second panoramic image.

19. The system of claim 15, wherein the one or more processors are further configured to determine the confidence level by further assigning a weight to each pair of matching visual features, the weight corresponding to at least one of:
  (1) reprojection error of the given matching visual features;
  (2) angular distances of each of the given matching visual features from a straight-line path between the first location and the second location; and
  (3) visual similarities between the given matching visual features.

20. The system of claim 19, wherein the one or more processors are further configured to determine the estimated location of the matching visual features by:
- casting a first ray from the first location to a first feature in the first set of visual features;
- casting a second ray from the second location to a second feature in the second set of visual features, the first feature and the second feature being a pair of matching visual features; and
- when the first ray and the second ray are within a predetermined distance of one another, setting a point closest to where the first ray and second ray come closest to one another as the estimated location of the first feature and the second feature.

* * * * *